(12) United States Patent
Le et al.

(10) Patent No.: US 9,348,344 B2
(45) Date of Patent: May 24, 2016

(54) CONSTANT FLOW RATE PRESSURE REGULATOR

(71) Applicant: FLUIDMASTER, INC., San Juan Capistrano, CA (US)

(72) Inventors: Tuan Le, Fountain Valley, CA (US); Jaime Berndt, Oceanside, CA (US); Adam Sampson, Ramona, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 529 days.

(21) Appl. No.: 13/655,180

(22) Filed: Oct. 18, 2012

(65) Prior Publication Data
US 2014/0109996 A1 Apr. 24, 2014

(51) Int. Cl.
| F15D 1/02 | (2006.01) |
| G05D 16/04 | (2006.01) |
| G05D 7/01 | (2006.01) |

(52) U.S. Cl.
CPC .............. *G05D 16/04* (2013.01); *G05D 7/012* (2013.01); *Y10T 137/7793* (2015.04)

(58) Field of Classification Search
CPC .............. F15D 1/02; F15D 1/025; F15D 1/10
USPC ..................................... 138/43, 45
See application file for complete search history.

(56) References Cited

U.S. PATENT DOCUMENTS

| 3,357,448 A | 12/1967 | Martin | |
| 3,815,636 A * | 6/1974 | Menzel | 239/542 |
| 3,841,354 A * | 10/1974 | McDonnell | A61M 5/16881 138/43 |
| 3,948,285 A * | 4/1976 | Flynn | 137/494 |
| 4,147,177 A | 4/1979 | Iwatsuki | |
| 4,150,696 A * | 4/1979 | Meier et al. | 138/44 |
| 4,254,791 A | 3/1981 | Bron | |
| 4,256,284 A * | 3/1981 | Balhouse | 251/126 |
| 4,343,305 A | 8/1982 | Bron | |
| 4,375,228 A * | 3/1983 | Widdowson | 138/46 |
| 4,437,493 A | 3/1984 | Okuda et al. | |
| 4,971,117 A * | 11/1990 | Hendrickson | 138/41 |
| 4,976,283 A * | 12/1990 | Wildfang et al. | 137/504 |
| 5,080,138 A * | 1/1992 | Haviv | 137/853 |
| 5,101,854 A | 4/1992 | Bron | |
| 5,421,363 A | 6/1995 | Bron | |
| 5,468,056 A * | 11/1995 | Kim | 303/87 |
| 6,017,099 A * | 1/2000 | Schneider et al. | 303/87 |
| 6,103,120 A * | 8/2000 | Hopkins | B01D 29/23 210/493.1 |
| 6,216,741 B1 * | 4/2001 | Aarntzen | F16K 17/30 138/43 |
| 6,254,576 B1 | 7/2001 | Shekalim | |
| 6,598,618 B1 | 7/2003 | Shay | |
| 6,789,577 B2 * | 9/2004 | Baltes | 138/30 |
| 2005/0178706 A1 * | 8/2005 | Bagci | B01D 29/21 210/130 |
| 2007/0123998 A1 * | 5/2007 | Egilsson et al. | 623/36 |
| 2008/0265064 A1 | 10/2008 | Keren | |
| 2010/0096127 A1 | 4/2010 | Jordy | |

* cited by examiner

*Primary Examiner* — James Hook
(74) *Attorney, Agent, or Firm* — Gordon Rees Scully Mansukhani LLP

(57) ABSTRACT

A flow valve that maintains a constant flow valve despite varying pressures at its inlet, comprising: (a) an elongated cage with alternating axially-extending pockets and ridges on its inner surface; and (b) an elongated generally conical shaped elastomeric sleeve received within the elongated cage; wherein the sleeve flexes outwardly at higher pressures, thereby decreasing the size of the flow channel between the sleeve and cage, thereby restricting flow to maintain constant flow valve despite varying inlet pressures.

14 Claims, 7 Drawing Sheets

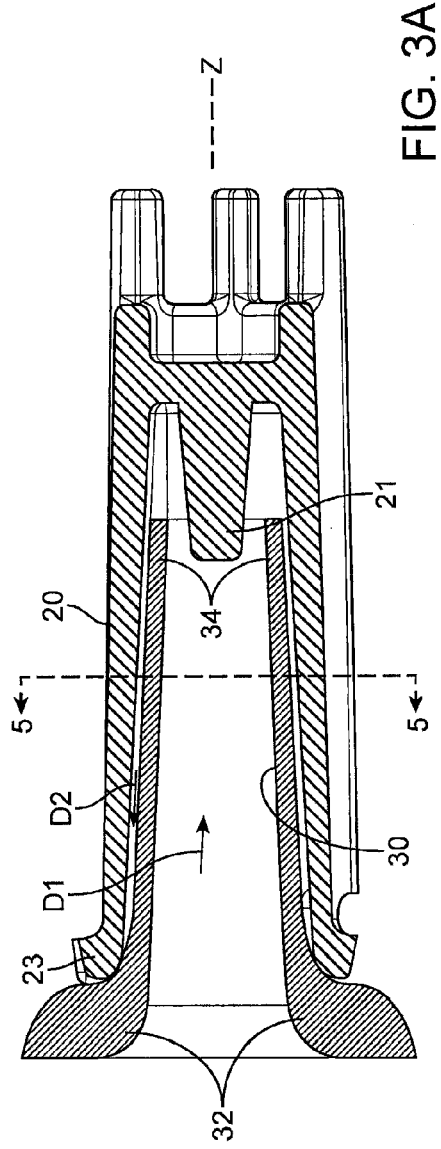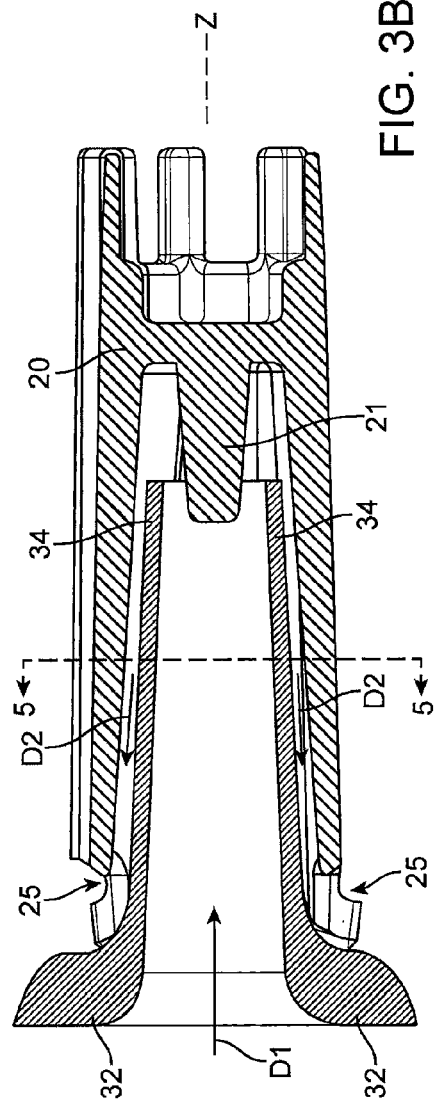

CONSTANT FLOW RATE PRESSURE REGULATOR

TECHNICAL FIELD

The present invention relates to pressure regulator valves which achieve constant flow rates.

SUMMARY OF THE INVENTION

The present invention provides a valve that achieves a constant flow rate despite being exposed to varying pressure conditions at its valve inlet. This is achieved by having an increased pressure result in a decrease in the cross sectional area of the flow channel through the valve. As such, a pressure increase causes the valve's flow channel to restrict in size, thus keeping the flow rate through the valve substantially constant.

In preferred embodiments, the present invention provides a pressure regulating constant flow valve, comprising: (a) an elongated cage comprising a generally tubular body with an open end and a closed end, the generally tubular body having inwardly and outwardly curved wall sections forming alternating axially-extending pockets and ridges on the inner surface of the generally tubular body; and (b) an elongated generally conical shaped elastomeric sleeve received within the elongated cage, the generally conical shaped elastomeric sleeve having a wide end and a narrow end, wherein the wide end of the elastomeric sleeve is supported at the open end of the elongated cage, and wherein the narrow end of the elastomeric sleeve is positioned spaced apart from the closed end of the elongated cage.

BRIEF DESCRIPTION OF THE DRAWINGS

FIG. 3A is a sectional side elevation view of the pressure regulator rotated to a first position.

FIG. 3B is a sectional side elevation view of the pressure regulator rotated to a second position.

DETAILED DESCRIPTION OF THE DRAWINGS

Figure 1:
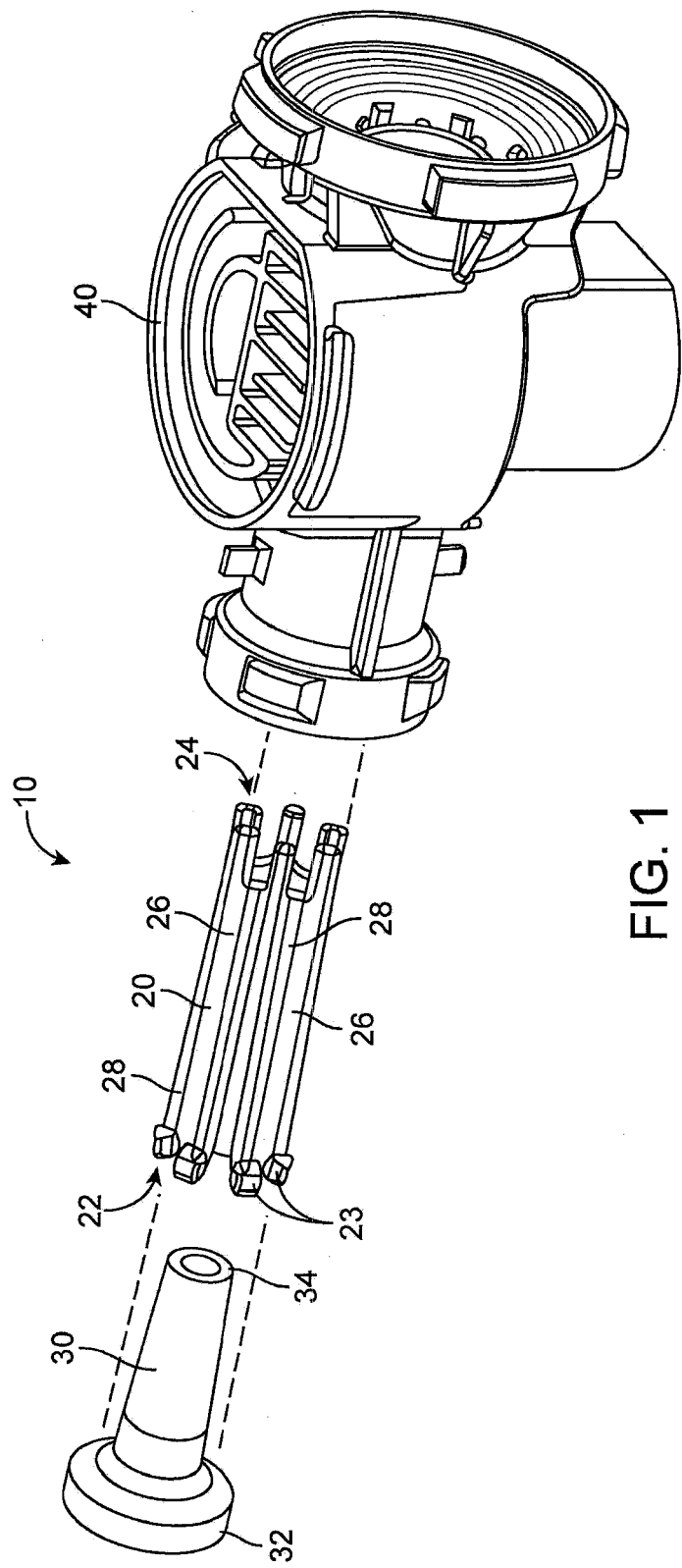
FIG. 1 is an exploded view of the pressure regulator as received into a flow valve.
Figure 2:
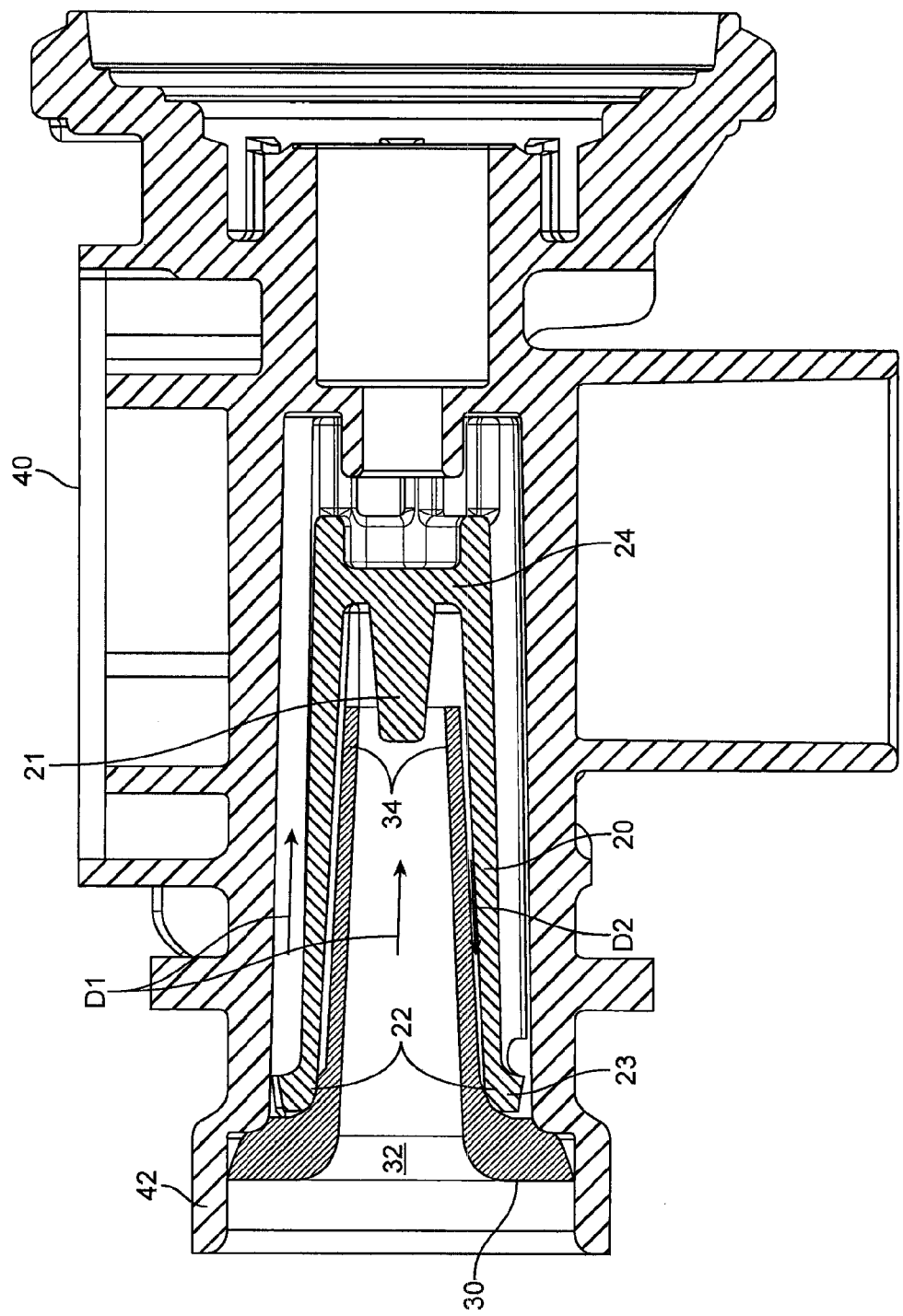
FIG. 2 is a sectional side elevation view corresponding to FIG. 1, showing the present pressure regulator received into the assembled flow valve.
Figure 4A:
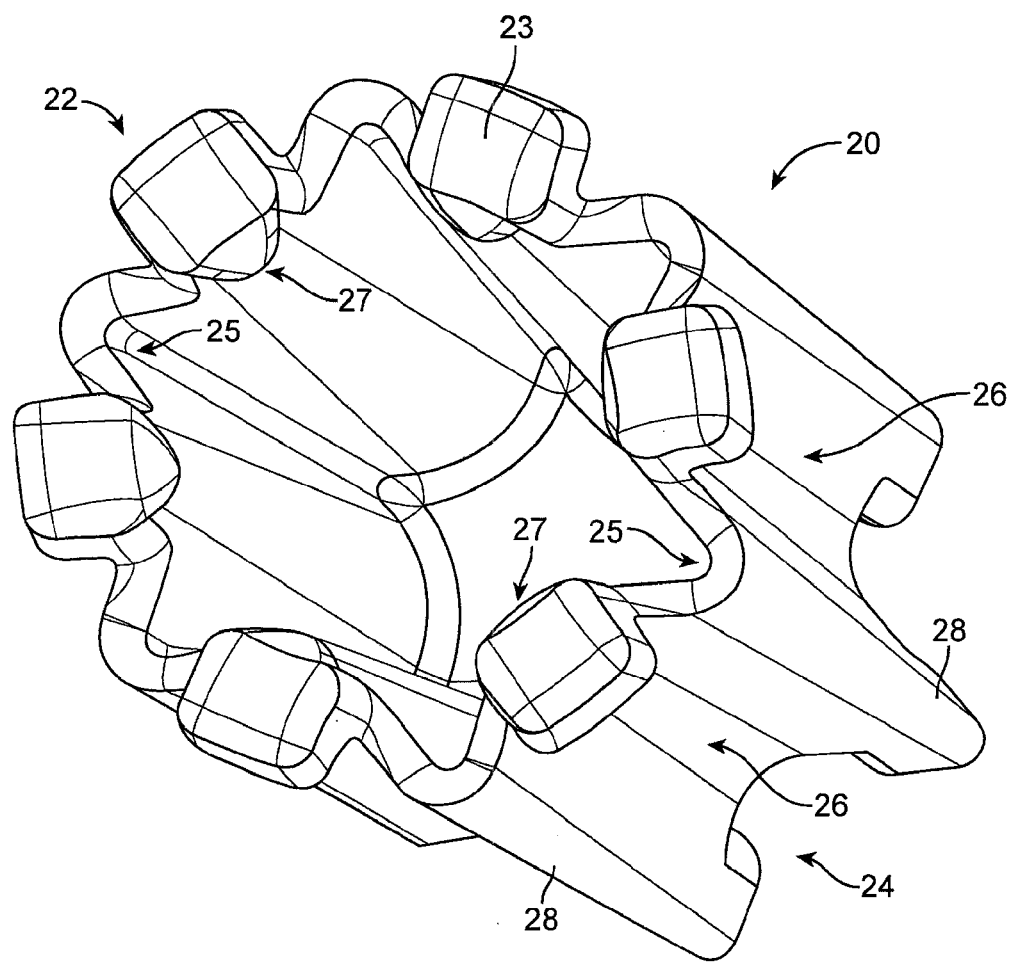
FIG. 4A is a perspective view of the regulator cage, showing its open end.
Figure 4B:
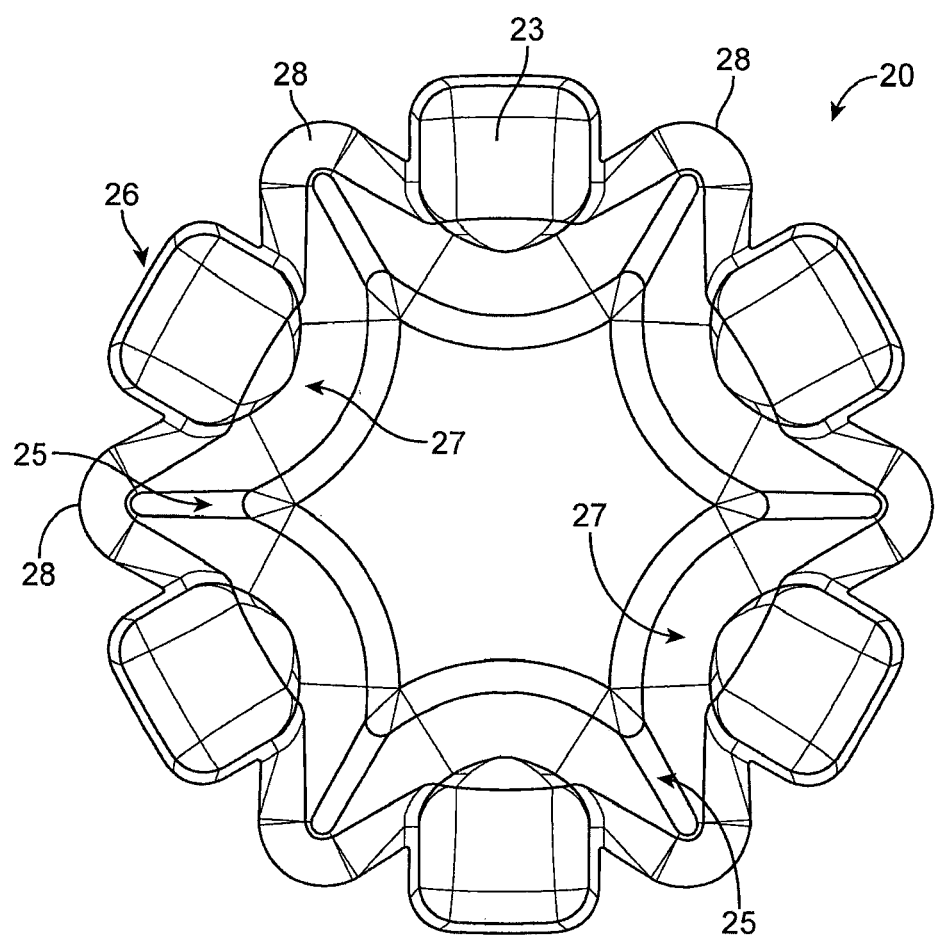
FIG. 4B is a front end view of the regulator cage, looking into it open end.
Figure 4C:
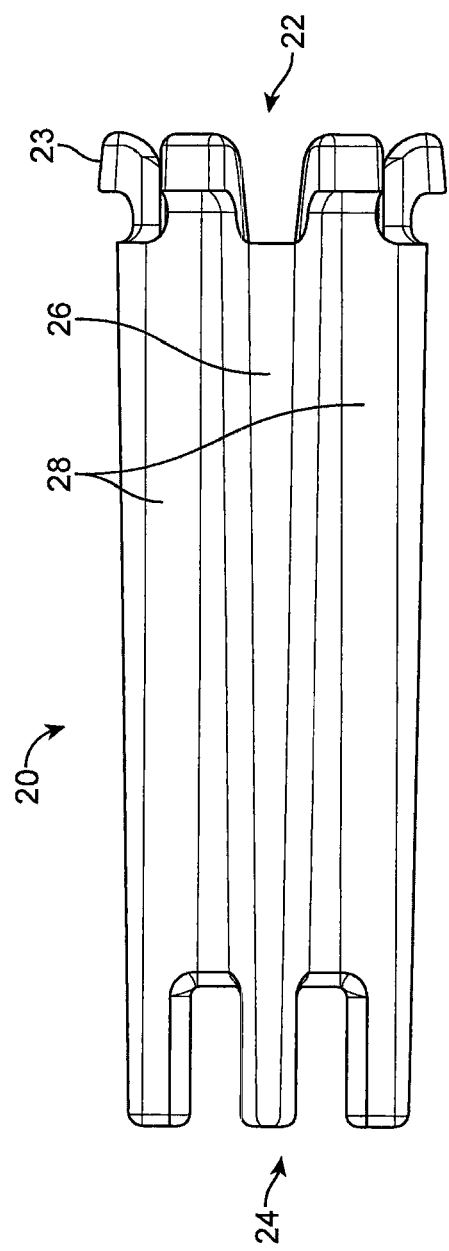
FIG. 4C is a side elevation view of the regulator cage.

FIG. 1 is an exploded perspective of the present constant pressure regulator 10 as received into an inlet of a flow valve 20. FIG. 2 is an assembled sectional side elevation view corresponding to FIG. 1. The present pressure regulator 10 acts as a constant flow valve, and comprises two main parts, being an elongated cage 20 and an elastomeric sleeve 30. Elastomeric sleeve 30 is positioned within cage 20, as shown. Together, these two elements are received within valve 40.

Elongated cage 20 comprises a generally tubular body, having an open end 22 and a closed end 24. Elongated generally conical shaped elastomeric sleeve 30 is received within elongated cage 20. Sleeve 30 is generally conical shaped, having a wide end 32 and a narrow end 34.

As seen in FIGS. 1, 4A, 4B, 4C and 5, the generally tubular body of cage 20 has inwardly curved wall sections and outwardly curved wall sections extending axially therealong. These inwardly and outwardly curved wall sections form alternating axially-extending pockets 25 and ridges 27 on the inner surface of the generally tubular body. In addition, pockets 26 and ridges 28 are formed on the outer surface of the generally tubular body of cage 20.

As seen in FIG. 2, wide end 32 of elastomeric sleeve 30 may be supported against the open end 42 of valve body 40 such that the narrow bottom end 34 of elastomeric sleeve 30 does not touch the closed bottom end 24 of the elongated cage 20. In preferred embodiments, open end 22 of cage 20 comprises a plurality of extensions 23 onto which the wide end 32 of sleeve 30 is positioned. Preferably as well, extensions 23 project outwardly into pockets 26 on the outer surface of the generally tubular cage body.

In operation, flow passes in direction D1 through the interior of sleeve 30 from wide inlet 32 to narrow outlet 34. Next, the fluid flows around the edges of narrow open end 34, turns around and moves in (the opposite) direction D2 in the passageway between sleeve 30 and cage 20. Finally, the fluid again reverses direction and moves back in direction D1 again between cage 20 and valve body 40 (eventually passing out of the valve).

FIGS. 3A and 3B show sectional elevation views that are slightly rotated (around axis Z) from one another. As such, FIG. 3A illustrates the locations at which sleeve 30 is received against extensions 23 on cage 20. FIG. 3B shows a slight rotation such that the flow gap through pockets 25 can be seen.

Figure 5A:
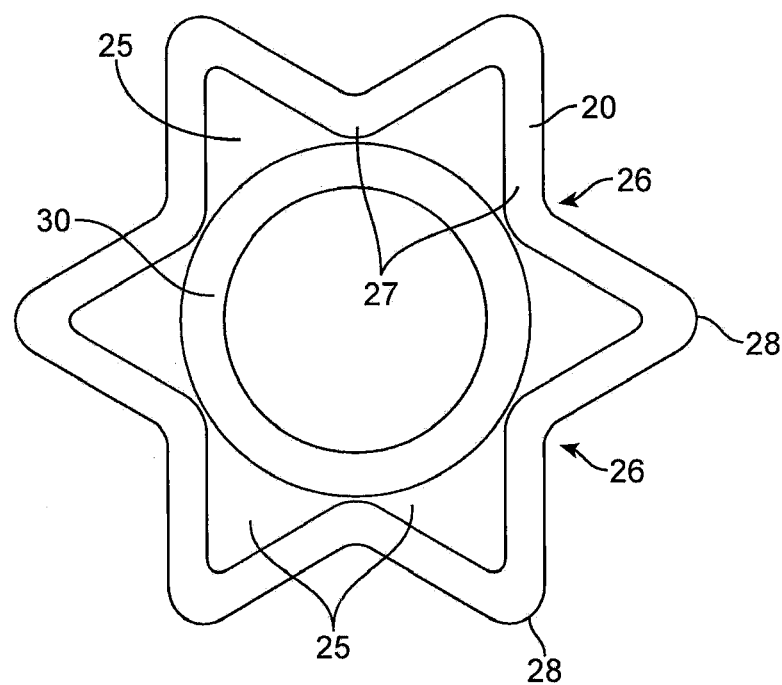
FIG. 5A is a sectional view along the width of the pressure regulator at low pressures (taken along line 5-5 in FIGS. 3A and 3B).
Figure 5B:
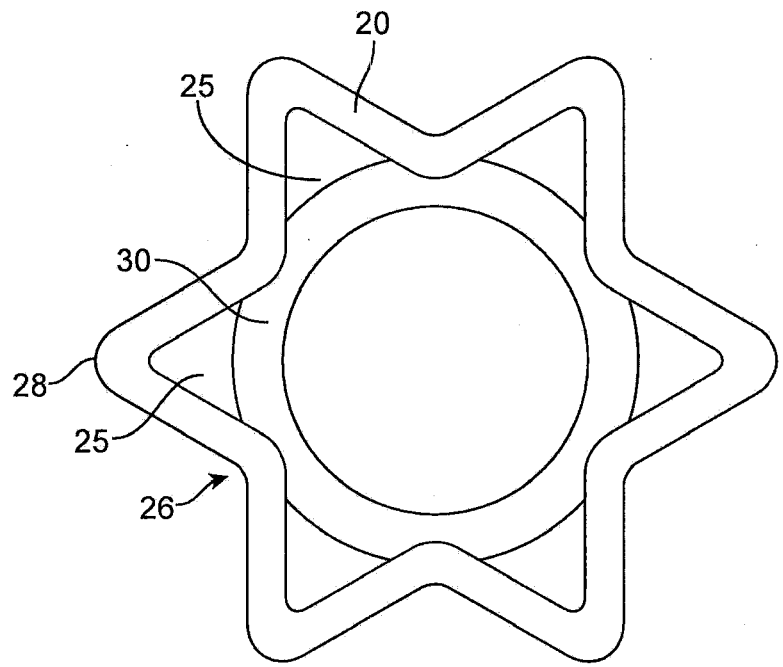
FIG. 5B is a sectional view along the width of the pressure regulator at high pressures (taken along line 5-5 in FIGS. 3A and 3B).

FIGS. 5A and 5B illustrate the pressure regulator function of regulator 10, as follows. FIG. 5A shows the regulator in a low pressure state (i.e.: when the inlet pressure at inlet 32 is low). In this state, sleeve 30 is in a "relaxed" state and fluid flows through sleeve 30 and then back between sleeve 30 and cage 20 in pockets 25.

FIG. 5B shows the regulator in a high pressure state (i.e.: when the inlet pressure at inlet 32 is high). In this state, sleeve 30 is in an "expanded" state. In this high pressure state, sleeve 30 flexes outwardly pushing against inner ridges 27 of cage 20. The outer edge of sleeve 30 is pushed into pockets 25, as shown. Importantly, however, sleeve 30 does not expand outwardly to the degree that it would completely fill pockets 25. As a result, the flow space between sleeve 30 and cage 20 is reduced (as compared to the low pressure state in FIG. 5A), but is not fully cut off. Thus, as the pressure is increased, sleeve 30 will flex outwardly more (reducing the flow space between sleeve 30 and cage 20). Conversely, as the pressure is decreased, sleeve 30 will flex outwardly less (increasing the flow space between sleeve 30 and cage 20). As can be appreciated, at pressures between "high" and "low", sleeve 30 will only partially flex outwardly. This design results in decreased flow at higher pressures and increases flow at lower pressures. The result is to provide a pressure regulator with a constant rate of low therethrough.

In optional preferred embodiments, elastomeric sleeve 30 has a wall thickness that varies along its length to fine tune the performance of the device. In addition, the number or depth of curves 25 and 27 can be varied to fine tune the performance of the present constant flow rate pressure device.

In addition, the present invention comprises an optional backflow prevention system, as follows. As seen in FIGS. 3A and 3B, cage 20 can have an optional center post 21 extending back into the narrow end 34 of sleeve 30. (Note: this optional center post 21 is not included in FIGS. 4A and 4B as the present invention covers versions both with and without the center post). In the event of a very low pressure or vacuum at open end 32 of sleeve 30, sleeve 30's narrow end 34 will collapse around center post 21. As a result, backflow (i.e.: flow in the opposite directions to those as illustrated in FIGS. 3A and 3B) will be prevented.

What is claimed is:

1. A pressure regulating constant flow rate valve, comprising:
   (a) a body having an outlet and an outlet, the body housing a cage and an elastomeric sleeve;
   (b) the cage comprising an elongated and generally tubular body; a star-shaped polygonal cross-section; the cage further comprising an open end and a closed end, the generally tubular body having inwardly curved wall sections and outwardly curved wall sections forming a plurality of axially-extending channels running the length of the generally tubular body;
   (c) the elastomeric sleeve further comprising an elongated and generally conical shape; the elastomeric sleeve being received within the cage, the sleeve having a wide end and a narrow end, wherein the wide end of the sleeve is supported at the open end of the elongated cage, and wherein flow is guided to travel through the elastomeric sleeve from the wide end to the narrow end; and wherein flow is reversed by the closed end of the elongated cage; and wherein flow is then again reversed by the wide end of the elastomeric sleeve to continue traveling between the cage and the constant flow rate valve body in the original direction of flow.

2. The valve of claim 1, wherein the narrow end of the sleeve does not contact the dosed end of the elongated cage.

3. The valve of claim 1, wherein the generally tubular body of the elongated cage further comprises a center post extending from the dosed end toward the open end, and wherein the center post is received within the narrow end of the sleeve to form a valve seal under negative pressure.

4. The valve of claim 1, wherein the sleeve flexes outwardly toward the inner surface of the cage when the pressure at the wide end of the generally conical shaped elastomeric sleeve is increased.

5. The valve of claim 4, wherein the sleeve pushes toward the inwardly curved wall sections on the inner surface of the cage but does not close the channels on the inner surface of the cage at relatively high pressures.

6. The valve of claim 1, wherein the sleeve has a wall thickness that varies along its length.

7. The valve of claim 1, wherein the cross-sectional perimeter of the sleeve does not contact the cross-sectional inner surface of the cage when pressure at the wide end of the sleeve is low.

8. The valve of claim 1, wherein the cage further comprises flanged extensions at the open end to divert flow to the axial channels.

9. The valve of claim 8, wherein the flanged extensions project outwardly from the inwardly curved wall sections of the cage.

10. The valve of claim 1, wherein the wide end of the elastomeric sleeve is seated against flanged extensions located at the open end of the cage.

11. The valve of claim 10, wherein the flanged extensions project outwardly from the inwardly curved wall sections of the cage.

12. The valve of claim 1, wherein the cross-sectional channels created by the inwardly curved wall sections of the cage increase in size from the closed end of the cage to the open end of the cage.

13. The valve of claim 1, wherein the cross-sectional channels created by the outwardly curved wall sections of the cage increase in size from the open end of the cage to the closed end of the cage.

14. The valve of claim 1, wherein the cage further comprises a cross section having a plurality of centrally-intersecting angles.

* * * * *